US007859460B2

(12) United States Patent
Hwang et al.

(10) Patent No.: US 7,859,460 B2
(45) Date of Patent: Dec. 28, 2010

(54) SWITCHED BEAM-FORMING APPARATUS AND METHOD USING MULTI-BEAM COMBINING SCHEME

(75) Inventors: Cheol-gyu Hwang, Daejeon-si (KR); Sung-tae Choi, Hwaseong-si (KR); Young-hwan Kim, Hwaseong-si (KR); Jung-han Choi, Hwaseong-si (KR); Dong-hyun Lee, Anyang-si (KR); Jae-hyon Kim, Suwon-si (KR); Hyun-cheol Park, Daejeon-si (KR); Yu-sung Lee, Daejeon-si (KR); Han-kil Lee, Busan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 12/116,385

(22) Filed: May 7, 2008

(65) Prior Publication Data

US 2009/0207077 A1 Aug. 20, 2009

(30) Foreign Application Priority Data

Feb. 14, 2008 (KR) ..................... 10-2008-0013589

(51) Int. Cl.
*H01Q 3/02* (2006.01)
*H04M 1/00* (2006.01)

(52) U.S. Cl. .................................... 342/374; 455/562.1

(58) Field of Classification Search ................. 342/374; 455/562.1
See application file for complete search history.

(56) References Cited

U.S. PATENT DOCUMENTS

| | | | | |
|---|---|---|---|---|
| 6,438,389 | B1 * | 8/2002 | Sandhu et al. | 455/562.1 |
| 6,470,192 | B1 | 10/2002 | Karlsson et al. | |
| 7,469,152 | B2 * | 12/2008 | Cetiner et al. | 455/562.1 |
| 2003/0179839 | A1 * | 9/2003 | Astrachan | 375/343 |
| 2004/0037263 | A1 | 2/2004 | Zeira | |
| 2004/0213187 | A1 | 10/2004 | Fujil | |
| 2005/0153657 | A1 | 7/2005 | Maruta | |

FOREIGN PATENT DOCUMENTS

| | | |
|---|---|---|
| JP | 10-200322 | 7/1998 |
| JP | 2005-252521 | 9/2005 |
| KR | 10-2002-0044666 | 6/2002 |
| KR | 10-2007-0094670 | 9/2007 |
| WO | WO 2003-096710 A2 | 11/2003 |

* cited by examiner

*Primary Examiner*—Thomas H Tarcza
*Assistant Examiner*—Harry Liu
(74) *Attorney, Agent, or Firm*—NSIP Law

(57) ABSTRACT

Provided is a switched beam-forming apparatus which includes a beam-forming unit forming a plurality of beams using an array antenna, a beam selection adjusting unit measuring Quality of Service (QoS) values of each of a plurality of signals received through the plurality of beams, a beam selecting unit selecting at least two beams with high QoS from among the plurality of beams according to the results of the QoS measuring, and a beam combining unit combining the at least two beams selected by the beam selecting unit.

16 Claims, 6 Drawing Sheets

A

B (A)

(B)

SWITCHED BEAM-FORMING APPARATUS AND METHOD USING MULTI-BEAM COMBINING SCHEME

CROSS REFERENCE TO RELATED APPLICATIONS

This application claims the benefit under 35 U.S.C. §119 (a) of a Korean Patent Application No. 10-2008-0013589, filed on Feb. 14, 2008, the disclosure of which is incorporated herein in its entirety by reference.

TECHNICAL FIELD

The following description relates to a beam-forming system for wireless communications, and more particularly, to a switched beam-forming apparatus and method for improving a Signal to Interference plus Noise Ratio (SINR) using a plurality of beams.

BACKGROUND

Beam-forming is a spatial filtering technique for transmitting signals in a desired direction or for receiving only signals transmitted in a desired direction, using a plurality of transmission/reception antennas. A method of forming beams in a desired direction includes a switched beam-forming method and an adaptive beam-forming method. The switched beam-forming method forms beams by setting weight vectors for several directions, and the adaptive beam-forming method updates weight vectors according to a user's positions.

By using such a beam-forming technique, Spatial Division Multiple Access (SDMA) can be implemented in such a manner that the range of a cell is increased or the same frequency is allocated to different users in different directions, in a wireless communication system.

Meanwhile, since a wireless communication system requires a very high channel capacity in order to transmit data at a high speed, a Multiple Input Multiple Output (MIMO) system has been developed to satisfy such a high channel capacity. In the MIMO system, generally, different transmission antennas transmit different types of information in order to increase the amount of information that is to be transmitted, or diversity is applied to transmission information in order to enhance reliability of information. Signals which are transmitted through a MIMO system undergo fading that varies depending on the spatially different paths of the signals, according to scatterers on a wireless channel, so that the signals have different spatial characteristics.

In the beam-forming system, a plurality of antennas receive signals with time differences according to the antennas' locations. The time differences are expressed by so-called steering vectors that represent the characteristics of the antennas in specific directions.

In order to form a beam in the beam-forming system, the antennas must have correlation and a distance (called "Nyquist space") between two antennas, and the distance has to be smaller than $\lambda/2$. However, if the antennas are installed at intervals which are narrower than $\lambda/2$, spatial diversity may not be utilized in the MIMO system. This is because antennas have to be spaced by about 10 through $20\lambda$ in order to utilize spatial diversity.

SUMMARY

According to an aspect, there is provided a switched beam-forming apparatus and a method using a multi-beam combining scheme for forming a plurality of beams, selecting beams subjected to independent wireless environments from among the plurality of beams, and combining the selected beams, so as to improve a Signal to Interference plus Noise Ratio (SINR) in a wireless communication system.

According to another aspect, instant application utilizes a concept that signals received through different beams are considered as independent signals because the signals are subjected to different channel environments. Here, by selecting beams with high Quality of Service (QoS) when beams are selected to be combined with each other, spatial diversity may be maximized.

According to still another aspect, there is provided a switched beam-forming apparatus using a multi-beam combining scheme including a beam-forming unit forming a plurality of beams using an array antenna, a beam selection adjusting unit measuring Quality of Service (QoS) values of each of a plurality of signals received through the plurality of beams, a beam selecting unit selecting at least two beams with high QoS from among the plurality of beams according to the results of the QoS measuring, and a beam combining unit combining the at least two beams selected by the beam selecting unit.

The beam-forming unit may include a plurality of hybrid couplers.

The beam selection adjusting unit may measure the QoS value of each signal using power of the signal, and the beam selection adjusting unit may measure the QoS of each signal using correlation between the signal and a preamble.

The beam selecting unit may select beams with low correlation between channels, and the beam selecting unit may select beams which are spaced from each other such that no overlapping area is generated between the beams.

The beam combining unit may assign predetermined weights to the at least two beams selected by the beam selecting unit, and combine the at least two beams to which the predetermined weights are assigned, and the beam combining unit may synchronize the at least two beams and combines the synchronized at least two beams.

According to yet another aspect, there is provided a switched beam-forming method using a multi-beam combining scheme, including forming a plurality of beams using an array antenna, measuring a Quality of Service (QoS) value of each of a plurality of signals received through the plurality of beams, selecting at least two beams with high QoS from among the plurality of beams according to the results of the QoS measurements, and combining the selected at least two beams.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
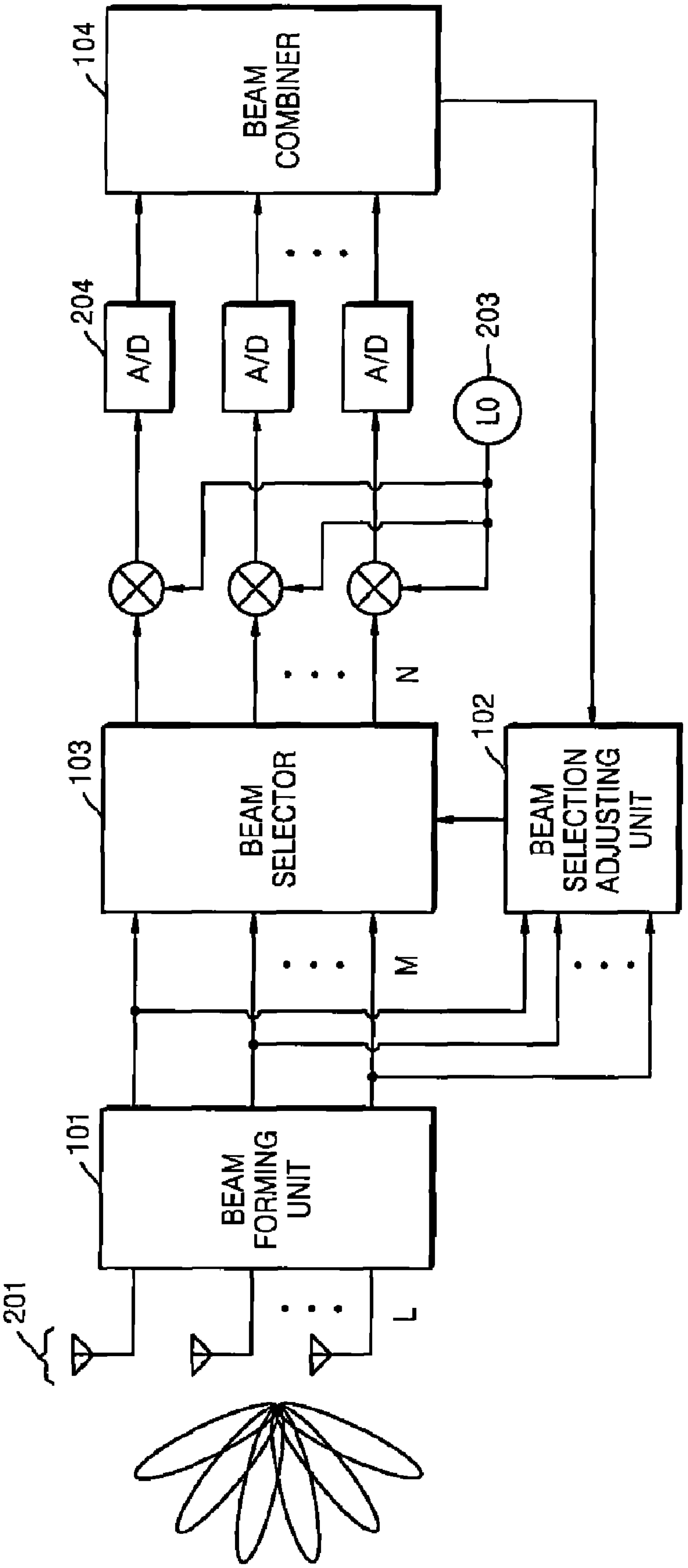
FIG. 1 is a block diagram of a switched beam-forming apparatus using a multi-beam combining scheme, according to an exemplary embodiment.

FIG. 1 is a block diagram of a switched beam-forming apparatus using a multi-beam combining scheme, according to an exemplary embodiment.

Referring to FIG. 1, the switched beam-forming apparatus includes a beam-forming unit 101, a beam selection adjusting unit 102, a beam selector 103, and a beam combiner 104.

The switched beam-forming apparatus may be installed in a receiving terminal of a wireless communication system. For example, signals output from a transmitting terminal may be transmitted in the form of a plurality of beam patterns to the switched beam-forming apparatus through multiple paths. That is, the beam-forming unit 101 forms a plurality of beam patterns, and the beam selector 103 may select two or more beams according to Quality of Service (QoS) of the beam patterns. A criterion by which the beam selector 103 selects the two or more beams is provided from the beam selection adjusting unit 102, and the selected beams are combined by the beam combiner 104 for spatial diversity.

The configurations and functions of the respective components of the switched beam-forming apparatus will be described below.

The beam-forming unit 101 forms a plurality of beams having a specific pattern using an array antenna 201 including a plurality of antenna elements. For example, the beam forming unit 101 forms M beams through the array antenna 201 including L antenna elements. Here, the array antenna 201 may include a plurality of omni-directional antennas or directional antennas having a single beam pattern. Accordingly, by using combinations of the antennas, that is, by using the array antenna 201, a plurality of beam patterns may be created.

Figure 2:
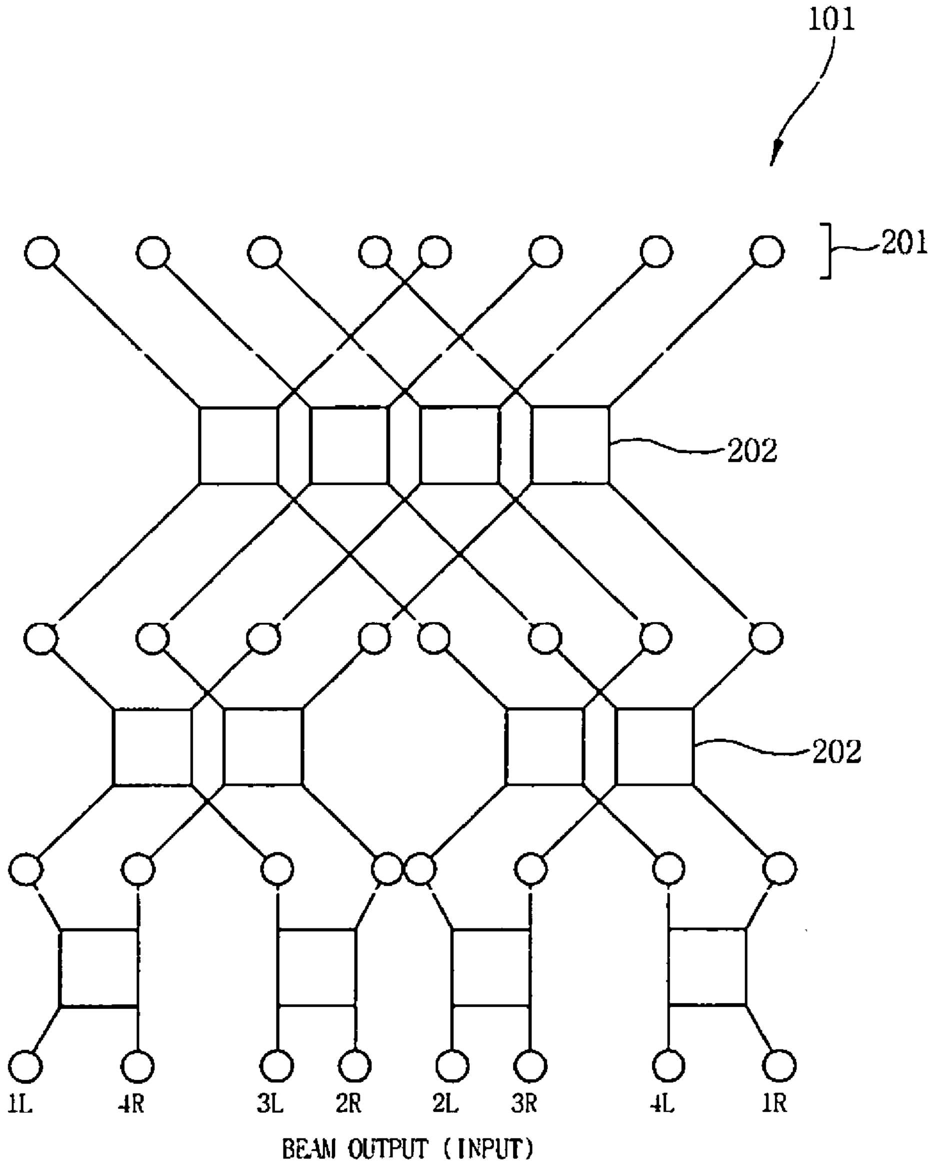
FIG. 2 is a view showing a beam-forming unit illustrated in FIG. 1, according to an exemplary embodiment.

The beam-forming unit 101 may form the beams using a Butler matrix. FIG. 2 is a view showing a beam-forming unit, which forms 8 input/output beams using the Butler matrix, according to an exemplary embodiment. Referring to FIG. 2, the beam-forming unit 101 may include a plurality of hybrid couplers 202 each of which couples two different signals so that they have different phases and outputs the coupled signals as two outputs. Accordingly, signals received through the array antenna 201 pass through the plurality of hybrid couplers 202, and then are formed as beams in desired directions.

Since the beams formed by the beam-forming unit 101 have specific patterns or specific directions, it is possible to independently receive signals which are transmitted in different directions.

M beams are formed in the above-described manner, N beams among the M beams are selected, and the selected N beams are combined by the beam combiner 104.

The beam selection adjusting unit 102 provides a criterion by which the beam selector 103 selects beams. That is, the beam selection adjusting unit 102 measures QoS values of signals which are received in the form of the beams formed by the beam-forming unit 101, and applies a predetermined control signal to the beam selector 103 so that the beam selector 103 may select beams with high QoS values.

The beam selection adjusting unit 102 may measure QoS values of the received signals using various methods. For example, QoS values of a received signal may be measured using the intensity or power of the signal or using correlation between the signal and a preamble. In more detail, the intensity or power of the received signal is measured, and the greater the intensity or power of the received signal is determined to be, the better the QoS of the received signal. A correlation value between the received signal and 64 bits of a preamble used in the 802.11a WLAN is measured, and the greater the correlation value is determined to be, the better the QoS of the received signal.

However, a method in which the beam selection adjusting unit 102 measures the QoS of the received signal is not limited to the above-described method, and a method of measuring QoS values of a received signal using a bit error rate (BER) is also possible. Also, combining the above-mentioned methods is possible.

The beam selector 103 selects N beams with high QoS values from among the M beams, according to the results of the QoS measurements, wherein N may be an integer of 2 or greater.

When the beam selector 103 selects specific beams, the beam selector 103 may select the specific beams considering correlation between channels, while selecting the specific beams according to a QoS constraint required by the beam selection adjusting unit 102 or according to the results of the QoS measurements of the beam selection adjusting unit 102. That is, the beam selector 103 selects specific beams according to a predetermined QoS constraint, and beam selector 103 also selects beams with low correlation between channels so that signals (or beam patterns) subjected to independent channel environments are selected.

Figure 3:
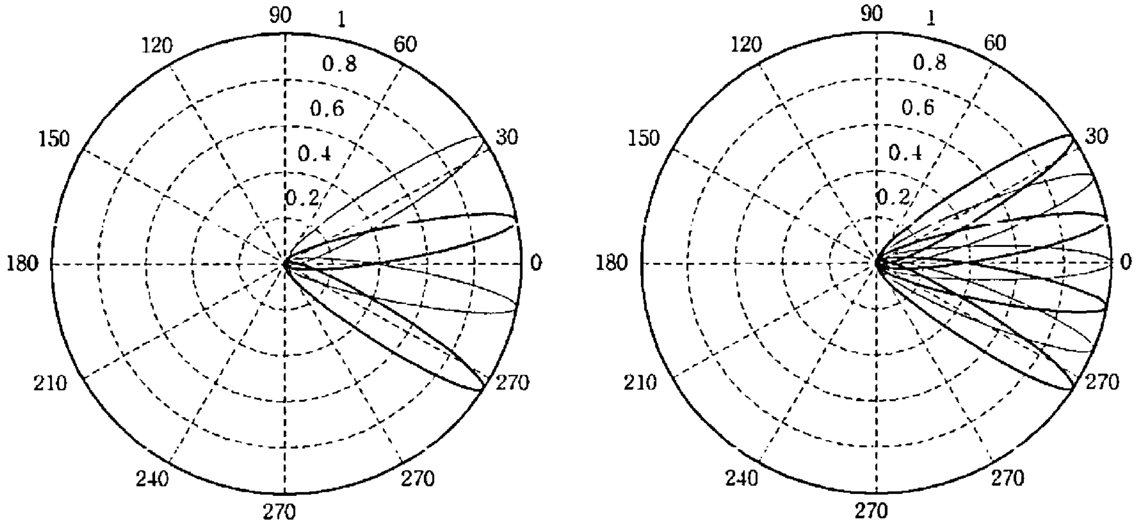
FIG. 3 illustrates beam patterns according to an exemplary embodiment.

For example, as illustrated in FIG. 3, if no overlapping area between selected beams exists (A), the selected beams can be used because there is no correlation between channels. However, if overlapping areas between selected beams exist (B), the selected beams are not used even when they have high QoS values, and different beams which are separated from each other are selected.

The beam combiner 104 combines the beams selected by the beam selector 103. An oscillator 203 for lowering the frequencies of the selected beams to basebands and an A/D converter 204 for converting analog signals into digital signals may be positioned between the beam combiner 104 and the beam selector 103.

Figure 4:
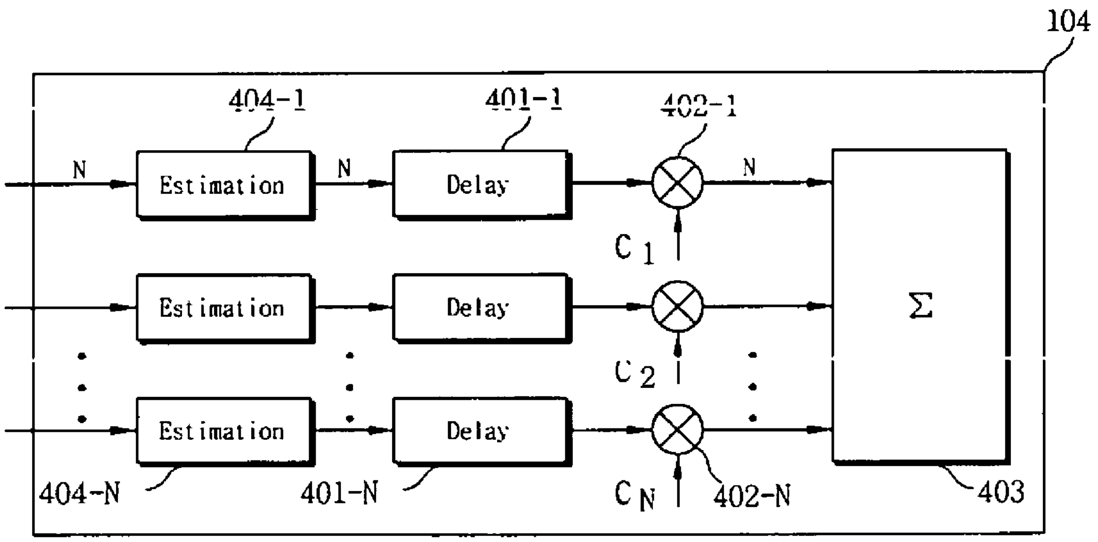
FIG. 4 is a block diagram of a beam combiner illustrated in FIG. 1, according to an exemplary embodiment.

FIG. 4 is a block diagram of the beam combiner 104 according to an exemplary embodiment.

Referring to FIG. 4, the beam combiner 104 includes a compensator 401, a multiplier 402, an adder 403, and an estimator 404. The estimator 404 and the compensator 401 are used for synchronization. The multiplier 402 multiplies a synchronized beam by a size compensation variable $C_i$, wherein the size compensation variable $C_i$ may vary depending on a beam combining method. Predetermined weights are assigned to at least two beams selected by the beam selector 103, and the at least two beams to which the predetermined weights are assigned are combined. Or, at least two beams selected by the beam selector 103 are synchronized, and the synchronized at least two beams are combined.

The beam combining method may be a Maximal Ratio Combining (MRC) method or an Equal Gain Combining (EGC) method. The adder 403 combines the resultant beams with each other.

For example, the beam combiner 104 synchronizes beams selected by the beam selector 103, assigns predetermined weights to the synchronized beams, and then combines the resultant beams with each other.

Generally, signals received through the array antenna 201 undergo fading due to transmission along multiple paths. Here, the multiple paths refer to a plurality of paths via which a plurality of transmission signals are received by antennas. That is, if a plurality of signals are received via different paths, when the signals are combined, the intensities of the signals may be different from their original intensities after an elapse in time, because the signals have been subjected to different amplitude attenuations and different changes in phase. In this case, several signals subjected to independent fading are selected, and are appropriately combined, thereby overcoming the affects of fading.

As a result, according to the switched beam-forming apparatus, since beams with high QoS values are selected by the beam selection adjusting unit 102 and the beam selector 103, and the selected beams are combined by the beam combiner 104, a SINR may be improved.

The operation of the switched beam-forming apparatus will be described using the equation, below.

A received signal which is input to the array antenna 201 via K multiple paths may be expressed by equation 1 below.

$$r(t)=Sx(t)\therefore x(t)=[h_1 d(t-\tau_1), h_2 d(t-\tau_2), \ldots, h_K d(t-\tau_K)]^T \quad (1)$$

In equation 1, x(t) represents the received signal, $h_k$ and $\tau_k$ respectively represent a channel value and a delay value of a k-th path, and a matrix S represents a steering vector for a direction of the k-th path.

The received signal is multiplied by a matrix B through the beam-forming unit 101, and the multiplied signal may be expressed by equation 2 below.

$$z(t)=Br(t) \quad (2)$$

In equation 2, the matrix B is an M×N dimensional matrix, and an m-th beam signal may be expressed by equation 3.

$$z_m(t)=\overline{h}_m d(t-\overline{\tau}_m)+\sum_{p=1}^{P_m}\overline{h}_p d(t-\overline{\tau}_p)+\overline{n}_m \quad (3)$$

For example, in equation 3, if it is assumed that $\overline{h_m}$ is a desired signal, several different multiple path components flow to respective beams and interfere which each other.

In order to select N signals from among M received signals, the beam selection adjusting unit 102 measures QoS values for the M signals. For example, if it is assumed that 4 beams are formed and 2 beams among the 4 beams are selected in a system which uses a preamble having 128 samples, it is possible to group the 4 beams into two sub groups, and measure QoS values using 64 samples for each group.

The selected beams may be expressed by a matrix P below.

$$\overline{z}(t)=Pz(t) \quad (4)$$

In equation 4, the matrix P is a N×N unit matrix.

The selected beams are combined by the beam combiner 104. A signal of an n-th beam obtained after estimating and delaying the combined beam may be expressed by equation 5 below.

$$\overline{z}_n(t)=h'_n d(t)+\sum_{p=1}^{P_n}h'_n d(t-\tau'_p)+n'_n \quad (5)$$

$$\therefore \tau'_p=\overline{\tau}_p-\overline{\tau}_n$$

Accordingly, a final signal may be expressed as shown below.

$$y(t)=w^H\overline{z}(t) \quad (6)$$

The final signal may have various values according to a weight vector w.

Figure 5:
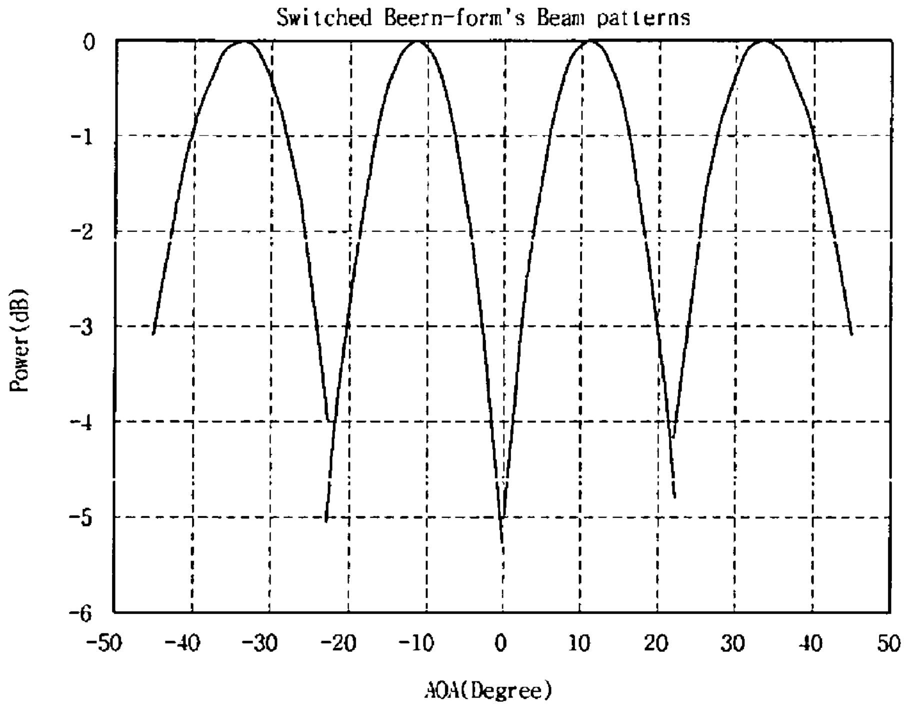
FIG. 5 shows graphs plotting antenna gains, according to an exemplary embodiment.
Figure 5:
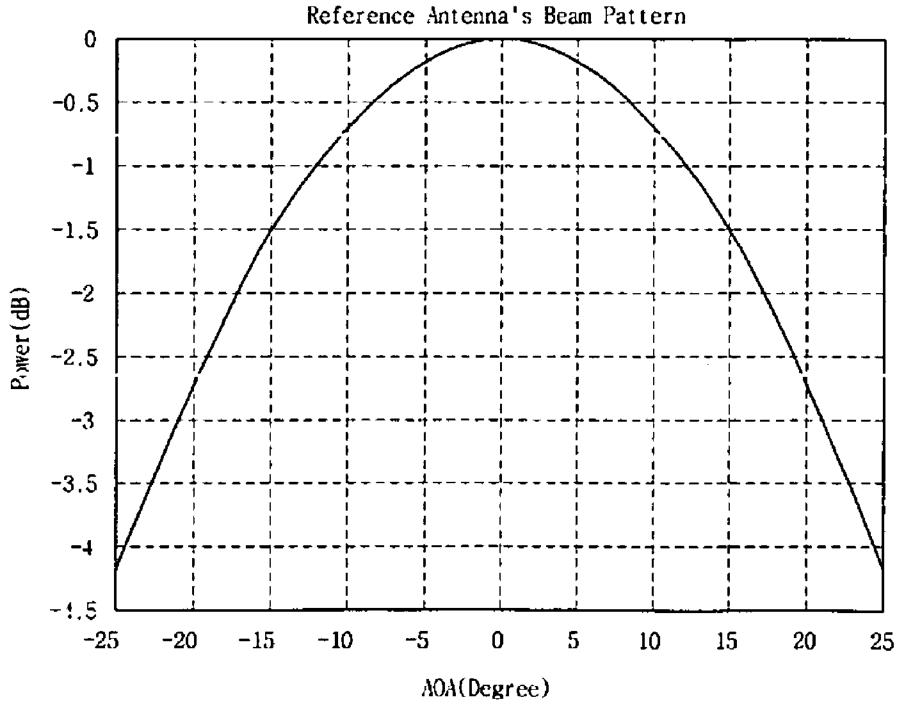

FIG. 5 shows a graph (A) plotting antenna gains for four beam patterns which are selected and combined according to an exemplary embodiment, and a graph (B) plotting antenna gains for a beam pattern of a reference antenna. Referring to FIG. 5, it is seen that the beam patterns formed by the switched beam-forming apparatus according to an embodiment have a faster reduction in antenna gain with respect to an incident angle than in the beam pattern formed by the reference antenna. This means that the switched beam-forming apparatus according to an embodiment may reduce more multiple path components than a general directional antenna can.

Figure 6:
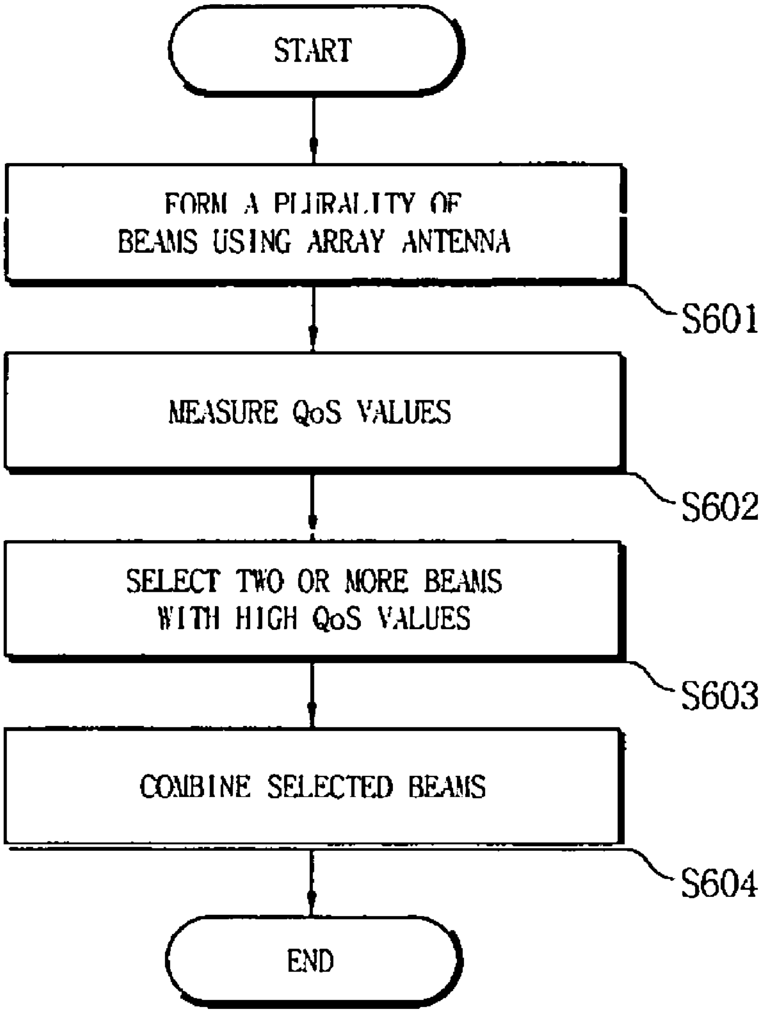
FIG. 6 is a flowchart of a switched beam-forming method using a multi-beam combining scheme, according to an exemplary embodiment.

Now, a switched beam-forming method using a multi-beam combining scheme according to an exemplary embodiment will be described with reference to FIG. 6.

First, a plurality of beams are formed using an array antenna (operation S601). In order to form the plurality of beams, the beam-forming unit 101 (see FIG. 1) including a plurality of hybrid couplers and an array antenna may be utilized.

Then, a QoS value of each signal received through the plurality of beams is measured (operation S602). The measuring of a QoS value may be performing by measuring Received Signal Strength Indicator (RSSI), Bit Error Rate (BER), etc. or by obtaining correlation between the received signal and a preamble. The beam selection adjusting unit 102 (see FIG. 1) may be used to measure the QoS value of the signal.

Then, at least two beams with high QoS are selected according to the results of the QoS measurements (operation S603). By selecting beams with both low correlation between channels and high QoS values, spatial diversity may be maximized. If any overlapping area is generated between the selected beams, selecting beams which are spaced from each other is preferable to selecting two adjacent beams, even when the two adjacent beams have high QoS values. The beam selector 103 may be used to select the at least two beams with high QoS values considering correlation between channels.

Finally, the selected beams are combined (operation S604). The combining of the beams may be implemented by the beam combiner 104, and it is possible to provide predetermined weights to the selected beams and then combine the beams to which the predetermined weights are provided, or to synchronize the selected beams and combine the synchronized beams with the same phase (for example, using a Max Rate Combining (MRC) method or an Equal Gain Combining (EGC) method).

Therefore, according to certain switched beam-forming apparatus and method described above, since output beams for signals received in different directions are formed and beams with high QoS values are selected from among the output beams, spatial filtering and spatial diversity may be efficiently used, and since the beams are combined, a SINR may be enhanced in a wireless communication system.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A switched beam-forming apparatus using a multi-beam combining scheme comprising:

a beam-forming unit configured to form a plurality of beams using an array antenna;

a beam selection adjusting unit configured to concurrently measure Quality of Service (QoS) values of each of a plurality of signals received through the plurality of beams;

a beam selecting unit configured to select at least two beams with high QoS from among the plurality of beams according to the results of the QoS measuring; and a beam combining unit configured to combine the at least two beams selected by the beam selecting unit.

2. The switched beam-forming apparatus of claim 1, wherein the beam-forming unit comprises a plurality of hybrid couplers.

3. The switched beam-forming apparatus of claim 1, wherein the beam selection adjusting unit is further configured to measure the QoS value of each signal using power of the signal.

4. The switched beam-forming apparatus of claim 1, wherein the beam selection adjusting unit is further configured to measure the QoS of each signal using correlation between the signal and a preamble.

5. The switched beam-forming apparatus of claim 4, wherein the preamble comprises 64 bits of preamble used in a 802.11a WLAN.

6. The switched beam-forming apparatus of claim 1, wherein the beam selecting unit is further configured to select beams with low correlation between channels.

7. The switched beam-forming apparatus of claim 1, wherein the beam selecting unit is further configured to select beams which are spaced from each other such that no overlapping area is generated between the beams.

8. The switched beam-forming apparatus of claim 1, wherein the beam combining unit is further configured to:

assign predetermined weights to the at least two beams selected by the beam selecting unit; and combine the at least two beams to which the predetermined weights are assigned.

9. The switched beam-forming apparatus of claim 1, wherein the beam combining unit is further configured to:

synchronize the at least two beams; and combine the synchronized at least two beams.

10. A switched beam-forming method using a multi-beam combining scheme, comprising:

forming a plurality of beams using an array antenna;

concurrently measuring a Quality of Service (QoS) value of each of a plurality of signals received through the plurality of beams;

selecting at least two beams with high QoS from among the plurality of beams according to the results of the QoS measurements; and combining the selected at least two beams.

11. The switched beam-forming method of claim 10, wherein the forming of the plurality of beams is performed by a Butler matrix method.

12. The switched beam-forming method of claim 10, wherein the measuring of the QoS value is performed by measuring power of each signal or by calculating correlation between the signal and a preamble.

13. The switched beam-forming method of claim 10, wherein the selecting of the at least two beams comprises selecting at least two beams with low correlation between channels.

14. The switched beam-forming method of claim 10, wherein the selecting of the at least two beams comprises selecting at least two beams which are spaced from each other such that no overlapping area is generated between the selected at least two beams.

15. The switched beam-forming method of claim 10, wherein the combining of the at least two beams comprises assigning predetermined weights to the selected at least two beams and then combing the at least two beams to which the predetermined weights are assigned.

16. The switched beam-forming method of claim 10, wherein the combining of the at least two beams comprises synchronizing the selected at least two beams and combining the synchronized at least two beams.

* * * * *